United States Patent
Jancik et al.

(10) Patent No.: US 7,030,779 B1
(45) Date of Patent: Apr. 18, 2006

(54) CARGO MANAGEMENT SYSTEM HAVING USER-SELECTABLE DEBUG OPTION

(75) Inventors: JoAnn E. Jancik, Victoria, MN (US); Anthony F. Robertson, Ealing (GB)

(73) Assignee: Unisys Corporation, Blue Bell, PA (US)

(*) Notice: Subject to any disclaimer, the term of this patent is extended or adjusted under 35 U.S.C. 154(b) by 158 days.

(21) Appl. No.: 10/830,612

(22) Filed: Apr. 23, 2004

Related U.S. Application Data

(60) Provisional application No. 60/510,289, filed on Oct. 10, 2003.

(51) Int. Cl.
*G08B 21/00* (2006.01)

(52) U.S. Cl. ............... 340/945; 340/815.4; 340/815.5; 340/825.36; 340/407.1; 705/1; 705/50

(58) Field of Classification Search ........... 340/945, 340/407.1, 815.4, 815.5, 815.54, 825.36, 340/825.4, 825.5; 705/1, 8, 50; 709/102, 709/217, 223
See application file for complete search history.

(56) References Cited

U.S. PATENT DOCUMENTS

| | | | | |
|---|---|---|---|---|
| 5,634,055 A | * | 5/1997 | Barnewall et al. | 707/103 R |
| 5,689,637 A | * | 11/1997 | Johnson et al. | 714/46 |
| 5,956,479 A | * | 9/1999 | McInerney et al. | 714/38 |
| 6,026,362 A | * | 2/2000 | Kim et al. | 705/1 |

* cited by examiner

*Primary Examiner*—Hung Nguyen
(74) *Attorney, Agent, or Firm*—Charles A. Johnson; Mark T. Starr; Shumaker & Sieffert PA

(57) ABSTRACT

A cargo management system is described in which a host computer system determines rejected freight shipment items and non-rejected freight shipment items based on one or more configurable parameters. A user interface module executing on a network interface computer of the cargo management system presents a user interface that includes a user-selectable debug option. During normal operation, i.e., when the debug option is not activated, the user interface module displays only the non-rejected freight shipment items. When the debug option is activated, however, the user interface module displays the rejected freight shipment items in addition to the non-rejected freight shipment items.

21 Claims, 5 Drawing Sheets

Routing Availability

| Flight | Date | Segment | Pickup Time | Latest Acceptance Time | Departure | Arrival | Number of Stops | Weight |
|---|---|---|---|---|---|---|---|---|
| UW7501 | 07APR03 | MSPORD | 07APR03 0700 | 07APR03 0800 | 07APR03 0700 | 07APR03 0800 | 0 | 110211 |
| UW7623 | 07APR03 | MSPORD | 07APR03 0700 | 07APR03 0800 | 07APR03 0700 | 07APR03 0800 | 0 | 110231 |
| UW7629 | 07APR03 | MSPORD | 07APR03 0700 | 07APR03 0800 | 07APR03 0700 | 07APR03 0800 | 0 | 110231 |
| UW7750 | 07APR03 | MSPORD | 07APR03 0700 | 07APR03 0800 | 07APR03 0700 | 07APR03 0800 | 0 | 110231 |
| UW787C | 07APR03 | MSPORD | 07APR03 0700 | 07APR03 0800 | 07APR03 0700 | 07APR03 0800 | 0 | 110231 |
| UW787B | 07APR03 | MSPORD | 07APR03 0700 | 07APR03 0800 | 07APR03 0700 | 07APR03 0800 | 0 | 110231 |
| UW787A | 07APR03 | MSPORD | 07APR03 0700 | 07APR03 0800 | 07APR03 0700 | 07APR03 0800 | 0 | 110231 |
| BA767A | 07APR03 | MSPORD | 07APR03 0700 | 07APR03 0800 | 07APR03 0700 | 07APR03 0800 | 0 | 110231 |
| BA767B | 07APR03 | MSPORD | 07APR03 0700 | 07APR03 0800 | 07APR03 0700 | 07APR03 0800 | 0 | 110231 |
| DE767B | 07APR03 | MSPORD | 07APR03 0700 | 07APR03 0800 | 07APR03 0700 | 07APR03 0800 | 0 | 110231 |
| DE767A | 07APR03 | MSPORD | 07APR03 0700 | 07APR03 0800 | 07APR03 0700 | 07APR03 0800 | 0 | 110231 |
| UW767H | 07APR03 | MSPORD | 07APR03 0700 | 07APR03 0800 | 07APR03 0700 | 07APR03 0800 | 0 | 110231 |
| UW7509 | 07APR03 | MSPORD | 07APR03 0700 | 07APR03 0800 | 07APR03 0700 | 07APR03 0800 | 0 | 110231 |

EXP RESTR SPLS DGR
Reason: Not Valid for Product

FIG. 4

CARGO MANAGEMENT SYSTEM HAVING USER-SELECTABLE DEBUG OPTION

This application claims priority to U.S. provisional application Ser. No. 60/510,289, filed Oct. 10, 2003, the entire content of which is incorporated herein by reference.

TECHNICAL FIELD

This invention generally relates to systems for managing and tracking cargo shipments.

BACKGROUND

One application of logistics management is the management of freight shipments. This process can be complex, and often requires coordination of multiple participants, including freight forwards, carriers, and other participants. In addition, the process often requires some form of shipment tracking, capacity control of cargo carrier routes, container control, terminal management, cash management, load limitations, consolidation, and other common freight management tasks.

To assist with this complex process, cargo management systems have been developed. These systems typically provide computing resources to process freight shipment data, and attempt to aid in scheduling, managing, and tracking various aspects of the freight shipment. These systems further provide a user with large amounts of data concerning various aspects of the freight shipments. For example, a cargo management system may provide a large list of cargo carriers, for example, but not limited to route data, to a user. Based on the provided data, the user schedules and books freight shipments.

To facilitate user selection, these systems may reduce the amount of data provided to the user by allowing the user to define search criteria. For example, the user may specify a product code that identifies the shipment as dangerous goods. In response, the cargo management system automatically rejects all instances of carrier types or routes that do not accept dangerous goods. As a result, the user need not consider any carrier type or route that will not accept the dangerous goods, and may more efficiently schedule and book shipment of the freight.

Due to the complexity of freight management, a cargo management system may also maintain a set of configurable parameters to aid the user in further identifying an acceptable subset of flights and other freight shipment items. The cargo management system applies the search criteria supplied by the user as well as the configurable parameters to automatically determine the set of matching flights for presentation to the user. Example configurable parameters maintained and automatically applied by the cargo management system include support tables that describe specific requirements for airports, product or service levels, pickup/delivery tables that identify required time offsets, and a variety of other parameters.

In the event these parameters are incorrectly configured, the cargo management system may provide an incomplete or otherwise inaccurate subset of flights or other shipping items to the user. Moreover, the user may not be aware that other acceptable items exist. As a result, the user may be forced to select sub-optimal flights or other freight shipment items. This problem may be compounded in that the cargo management system may retrieve flight information from a flight management system, which may similarly automatically apply configurable parameters to determine acceptable flights.

SUMMARY

In general, the invention is directed to techniques for managing and tracking freight shipments. More specifically, a cargo management system is described that presents a user interface with which an authorized user of the system interacts to perform a number of tasks associated with shipment management. Exemplary tasks include capture of shipment data, scheduling shipment of individual freight, assigning freight to cargo carrier containers (i.e., unit load devices), terminal management, cash management, consolidation, and other common freight tasks.

In accordance with the techniques described herein, the cargo management system presents the user interface to include a debug option to aid the user in verifying proper configuration of parameters maintained by the cargo management system. When the user activates the debug option, the cargo management system generates the user interface to include a set of matching freight shipment items as well as any rejected freight shipment items, i.e., those freight shipment items that have been automatically rejected based on application of configurable parameters and the user-supplied search criteria. In addition, for each rejected item, the cargo management system provides an indication of why the item was rejected and, therefore, not presented to the user when the debug option is inactive.

In one embodiment, the invention is directed to a cargo management system comprising a network interface computer and a user interface module executing on the network interface computer, wherein the user interface module presents a user interface to receive search criteria and a user-selectable debug option. The system further comprises a host computer that determines matching freight shipment items based on the search criteria, and applies a set of configurable parameters to the matching freight shipment items to identify a rejected portion and a non-rejection portion of the matching freight shipment items. The user interface module displays the non-rejected portion and the rejected portion of the matching freight shipment items when the debug option is activated.

In another embodiment, the invention is directed to a processor-based method comprising presenting a user interface to receive search criteria and a user-selectable debug option, and determining matching freight shipment items based on the search criteria. The method further comprises applying a set of configurable parameters to the matching freight shipment items to identify a rejected portion and a non-rejection portion of the matching freight shipment items, and displaying the non-rejected portion and the rejected portion of the matching freight shipment items when the debug option is activated.

In another embodiment, the invention is directed to a cargo management system comprising a first interfacing means for outputting a first user interface that includes search criteria input means and debug control input means, and a selection means for selecting matching freight shipment items based on the search criteria. The cargo management system further comprises a rejection means for rejecting at least a portion of the matching freight shipment items, and a display means for displaying the rejected portion of the matching freight shipment items based on a state of the debug control input means.

In another embodiment, the invention is directed to a system comprising a cargo management system that presents a user interface to receive search criteria and a debug option, and a flight management system storing flight data and a first set of configurable parameters. The flight management system identifies a set of matching flights from the flight data based on the search criteria, and further identifies a rejected portion and a non-rejected portion of the matching flights based on the first set of configurable parameters. The cargo management system receives the non-rejected portion and the rejected portion of the matching flights from the flight management system, and displays the non-rejected portion and the rejected portion of the matching flights when the debug option is active.

The cargo management system may provide one or more advantages. The user may, for example, activate the debug option to examine the freight shipping items, e.g., flights, that were automatically rejected via the cargo management system. With aid from indicators associated with each rejected item, the user may be able to assess whether the configurable parameters are properly configured and whether the cargo management system is correctly rejecting the items based on the configurable parameters. In the event the cargo management system erroneously eliminates acceptable shipping items, the user may use the indicator to determine which of the configurable parameters needs to be reconfigured. Further, the user may determine that search criteria have been incorrectly entered, causing the cargo management system to incorrectly reject the shipping options. In this manner, the incorporation of a user-selectable debug option may allow a user to ensure that the cargo management system accurately and reliably rejects shipping items.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 illustrates an exemplary user interface in which the cargo management system presents routing data that has been automatically rejected with a debug option activated.

DETAILED DESCRIPTION

Figure 1:
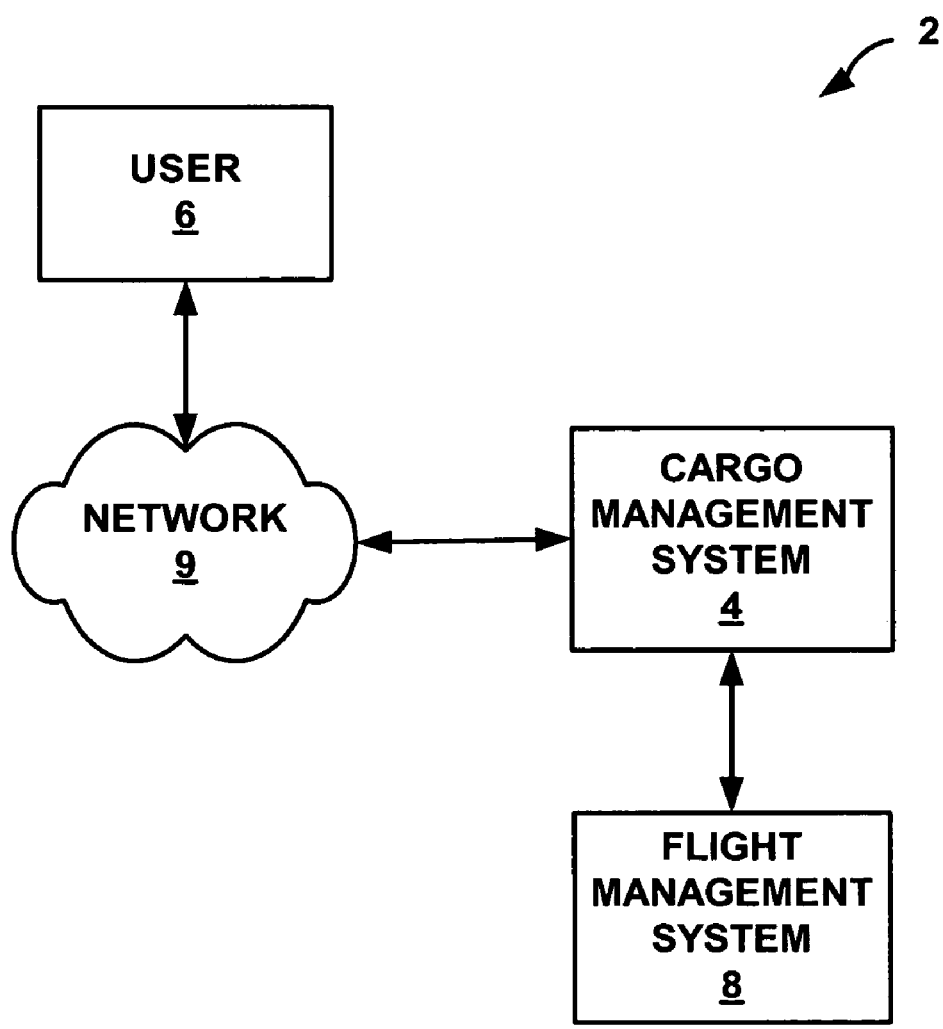
FIG. 1 is a block diagram illustrating an exemplary network-based environment for managing and tracking shipments.

FIG. 1 is a block diagram illustrating an exemplary network-based environment 2 in which cargo management system 4 provides network-based management of freight shipments. As described in detail herein, cargo management system 4 presents a user interface with which an authorized user 6 interacts to perform a wide range of tasks associated with shipment management. It should be understood that the various techniques, functions, and interactions in the cargo management system can extend to a variety of cargo carriers and can be used with various types of available carriers. Various types of carriers implicate related types of shipping and routing information that is important in making specific shipping selections. A user may be, for example, a station manager, office personnel, warehouse staff, space control staff, and other shipping related personnel. Exemplary tasks include capture of shipment data, scheduling the shipment of individual freight, assigning freight to airline containers (i.e., unit load devices), terminal management, cash management, consolidation, and other common freight tasks. It is recognized that there are similar and related shipping parameters for various types of scheduled cargo carriers. For exemplary purposes, various embodiments of the invention will be described with relation to air carriers.

Cargo management system 4 may present the user interface as a graphical set of interrelated screens (not shown in FIG. 1). Typically, the tasks associated with shipment management require cargo management system 4 to present a large set of freight shipment items, for example cargo carriers, flights or routes, schedules, limitations, and the like, for selection by the user. User 6 selects from the large set of items to manage shipments. User 6 may select from various available carriers, which by way of example can include a large set of flights, to book a shipment.

The techniques described herein may be particularly useful in environments in which cargo management system 4 retrieves at least a subset of the freight shipment items from one or more external systems. For example, as illustrated in FIG. 1 for exemplary purposes, cargo management system 4 may communicate with a flight management system 8 to gather a large set of route data. Cargo management system 4 may query flight management system 8 for route data using one or more search criteria, as will be described in detail below, provided by user 6. Flight management system 8 may, for example, comprise a complex system that maintains a substantial database of carrier flights. For each flight, flight management system 8 may maintain data describing the respective carrier, departure time and location, arrival time and location, airplane type, cargo limitations, and other flight data.

To facilitate selection by user 6, cargo management system 4 and/or flight management system 8 may automatically reduce the acceptable freight shipment items based on respective configurable parameters that are maintained by the cargo management system (e.g., by way of input from a station manager or other personnel) to aid the user in further identifying an acceptable subset of flights and other freight shipment items. Cargo management system 4 displays the reduced acceptable shipment items to user 6, thereby allowing user 6 to more quickly and efficiently book the shipment.

In accordance with the techniques described herein, cargo management system 4 presents the user interface to include a "debug option," i.e., a selectable option to aid user 6 in verifying proper configuration and application of the configurable parameters by the cargo management system and flight management system 8. When user 6 activates the debug option, cargo management system 4 generates the user interface to include matching freight shipment items as well as freight shipment items that were automatically rejected by either the cargo management system or flight management system 8 due to their respective configurable parameters. In addition, for each item included within the rejected freight shipment items, cargo management system 4 provides an indication of why the respective freight shipment item was rejected and, therefore, not presented to user 6.

For example, upon receiving a query from cargo management system 4, flight management system 8 selects matching flights based on the search criteria received from cargo management system 4. Flight management system 8 then applies its configurable parameters to reduce the matching set of flights, and returns data describing the non-rejected portion of the matching flights. In addition, flight management system 8 returns data identifying the flights that were rejected due to the configurable parameters. Flight management system 8 may also return indications of why the flights are rejected.

Cargo management system 4, after receiving the set of matching flights, may further reduce the set of matching flights, i.e., by automatically applying its own set of configurable parameters. For example, cargo management system 4 may automatically select only those flights that have capacity for carrying cargo, conform to certain size requirements, accept dangerous goods, and a wide variety of other criteria that reject freight shipment items on freight-specific requirements. Example configurable parameters maintained and automatically applied by cargo management system 4 to further reduce the flights include support tables that describe specific requirements for airports, product or service levels, required pickup/delivery time offsets, and a variety of other support tables.

By making use of the debug option, user 6 may examine rejected freight shipment items as well as their respective indicators to determine whether the configurable parameters are properly configured, and whether cargo management system 4 and flight management system 8 are correctly applying their configurable parameters in rejecting flights. In the event cargo management system 4 or flight management system 8 are erroneously eliminating acceptable items, user 6 may use the indicators to determine which of the configurable parameters is configured incorrectly.

The debug functionality supported by cargo management system 4 allows for validation of these processes, and allows user 6 to ensure that acceptable flights are not being erroneously rejected by the cargo management system 4 or flight management system 8 due to incorrectly configured parameters. The techniques are generally described herein in reference to rejecting flights, for exemplary purposes, and may be applied to freight shipment items generally. Other exemplary types of freight shipment items include container types, special handling requirements, time requirements, weight requirements, routing items, carrier restrictions, delivery restrictions, pickup restrictions, and other freight shipment items.

User 6 typically accesses cargo management system 4 via network 9 using a remote computing device (not shown) having suitable communication software (not shown), e.g., a web browser. The remote computing device may comprise any network-enabled computing device, such as a workstation, personal computer, laptop computer, or a personal digital assistant (PDA). Network 9 may be a private network or a public network, such as the Internet.

Figure 2:
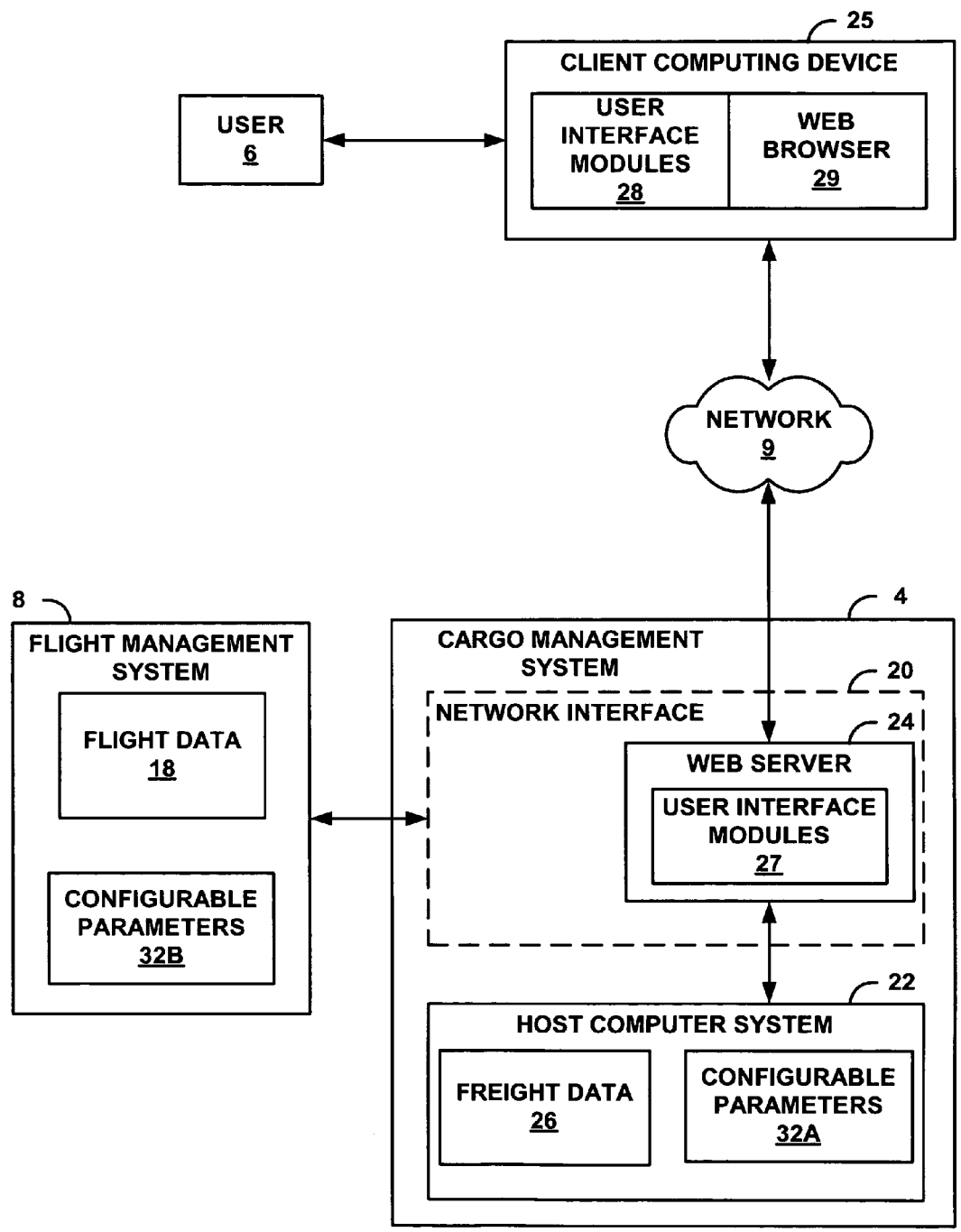
FIG. 2 is a block diagram illustrating an exemplary network-based environment and an embodiment of a cargo management system.

FIG. 2 is a block diagram further illustrating network based environment 2 and an exemplary embodiment of cargo management system 4 in further detail. In the exemplary embodiment, cargo management system 4 includes a host computer system 22 coupled to a network 9 via a network interface 20. In general, host computer system 22 provides a computing platform for hosting shipment management services for logistics service providers, including scheduling and booking shipments. Host computer system 22 may comprise, for example, a Unisys 2200 series computer system, executing logistics management software, available from Unisys Corporation.

Network interface 20 comprises one or more computing devices, e.g., a web server 24, that provide a network-based interface by which user 6 accesses host computer system 22. Although host computer system 22 and web server 24 are illustrated separately in FIG. 2 for exemplary purposes, cargo management system 4 may be realized by a single computing device or a plurality of cooperating computing devices.

Web server 24 provides a web-based interface by which an authorized user 6 communicates with cargo management system 4 via network 9. In one configuration, web server 24 executes web server software, such as software marketed by Microsoft Corporation under the trade designation "INTERNET INFORMATION SERVER." As such, web server 24 provides an environment for interacting with user 6 via user interface modules 27. More specifically, user interface modules 27 may comprise "server side" user interface modules that execute within an operating environment provided by web server 24. Alternatively, or in addition, user interface modules 27 may be downloaded from web server 24 and executed on a client computing device 25 as "client-side" user interface modules 28. User interface modules 27 may include Active Server Pages, web pages written in hypertext markup language (HTML) or dynamic HTML, Active X modules, Java scripts, Java Applets, Distributed Component Object Modules (DCOM), and the like, all of which are well-known. Client-side user interface modules 28 could, for example, include Active X components or Java scripts executed by web browser 29 executing on client computing device 25. As used herein, a software 'module' generally refers to programming code, such as a collection of specific routines and data structures, that perform a particular task. A software module generally comprises two parts: namely, an interface, which includes necessary constants, data types, variables, and routines that can be accessed by other modules or routines; and implementation software that implements the function of the module. When a 'module' is implemented in hardware, it comprises a self-contained component that performs a designated function within a system.

User 6 interacts with user interface modules 27 to manage all aspects of freight shipment. User interface modules 27 access host computer system 22 to retrieve a variety of freight data 26, and present the freight data 26 to user 6 for scheduling and managing freight shipment. During this process, cargo management system 4 may query flight management system 8 for a set of flights that may be used for shipping the freight. In particular, cargo management system 4 queries flight management system 8, and communicates one or more of the search criteria provided by client computing device 25.

Upon receiving the query from cargo management system 4, flight management system 8 selects flights from flight data 18 based on the search criteria. Flight data 18 may be stored within a database management system (not shown) having one or more database servers (not shown). Based on the search criteria, the database management system returns a portion of flight data 18 that describes matching flights.

Flight management system 8 then applies configurable parameters 32B to further reduce the set of matching flights, and returns data to cargo management system 4 that describes the remaining matching flights, i.e., the non-rejected portion of the matching flights selected from flight data 18. In addition, flight management system 8 returns data identifying the flights that were rejected due to configurable parameters 32B. Flight management system 8 may also return indications of why the flights are rejected. In particular, flight management system 8 may generate indications of why the flights are rejected and associate an indication with each rejected item. The indicators may take the form of a code, text string describing a reason, or other form of indicator as to why the additional flights were rejected due to configurable parameters 32B.

Host computer system 22 receives the set of matching flights from flight management system 8, and may further reduce the set of matching flights by automatically applying its own set of configurable parameters 32A. Configurable parameters 32A and 32B may both be stored in any of a variety of data structures. For example, configurable parameters 32A and 32B may be defined by data stored in a database, tables, trees, linked lists, and other such data structures.

User interface modules 27 presents a user interface to include a user-selectable debug option to aid user 6 in verifying proper configuration and application of the configurable parameters 32A, 32B by cargo management system 4 and flight management system 8, respectively. When user 6 activates the debug option, user interface modules 27 generate the user interface to include the remaining (i.e., non-rejected) matching flights and any flights that were automatically rejected due to configurable parameters 32A, 32B. In addition, for each item included within the rejected flights, cargo management system 4 provides an indication of why the flights were rejection. For example, user interface modules 27 may generate the user interface to include a set of "indicators", not shown in FIG. 2. Each indicator corresponds to one or more rejected flights, and provides an indication of why the respective flight was rejected. In this manner, the debug option allows user 6 to determine whether configurable parameters 32A and 32B are properly configured and being properly applied by host computer system 22 and flight management system 8, respectively. In other words, the debug functionality supported by cargo management system 4 allows for the validation of these processes, and allows user 6 to ensure that acceptable flights are not being erroneously rejected.

Figure 3:
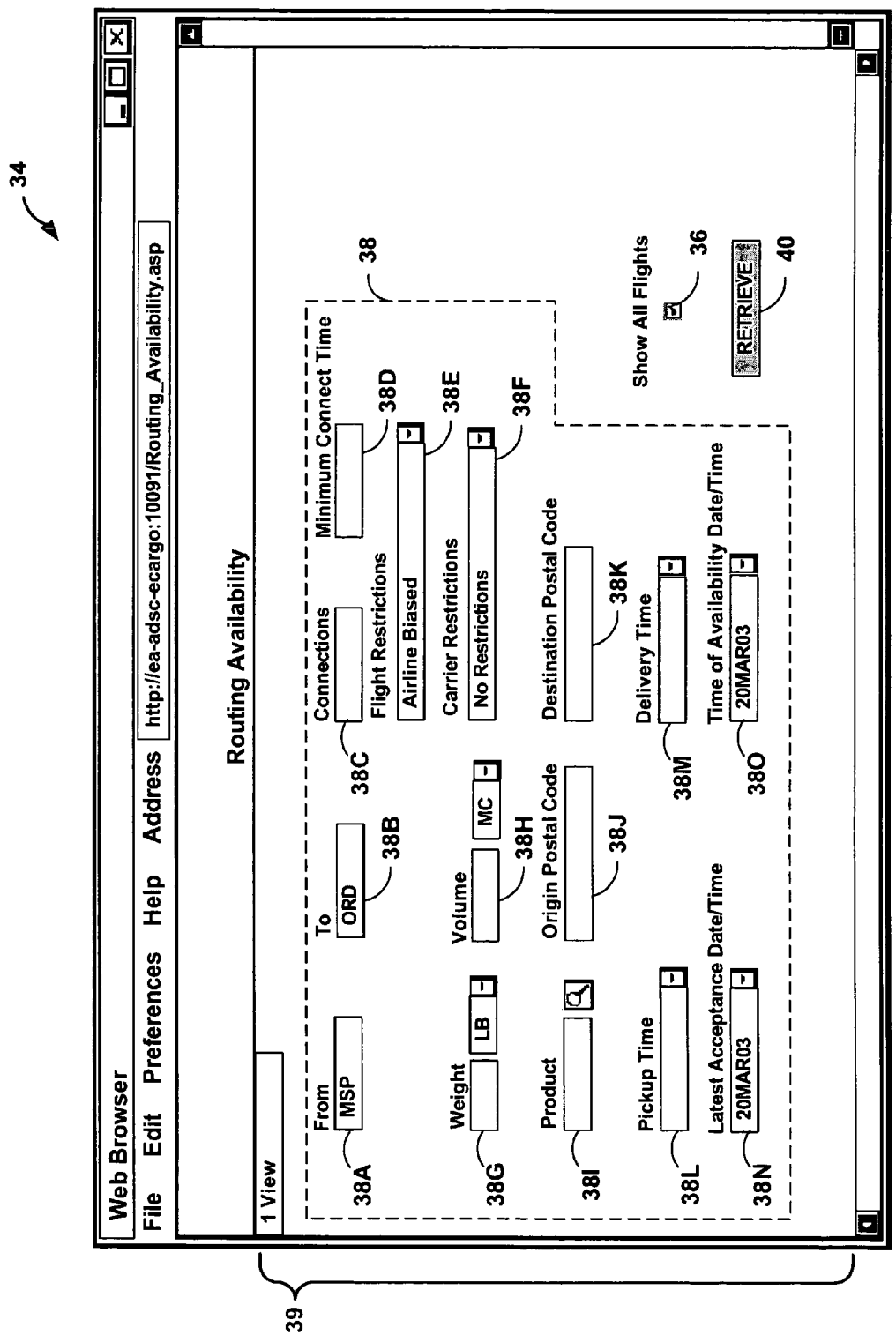
FIG. 3 illustrates an exemplary user interface presented by the cargo management system.

FIG. 3 illustrates an exemplary user interface 34 presented by user interface modules 27 for scheduling and tracking shipments. In the illustrated embodiment, user interface 34 provides a debug option 36, labeled "Show All Flights", that allows user 6 to selectively display flight data that would otherwise be automatically filtered via host computer system 22 or flight management system 8.

As illustrated in the exemplary embodiment, user interface 34 further includes search criteria inputs 38A–38O (collectively "search criteria inputs 38") and an action input 40. By interacting with user interface 34, user 6 may enter one or more search criteria into search criteria inputs 38 within an item specification region 39. For example, user 6 may specify "MSP" airport code in search criteria input 38A and "ORD" airport code in search criteria input 38B, as shown in FIG. 3, as starting and destination airport locations for shipment of one or more freight items. Other search criteria that user 6 may specify via search criteria inputs 38C–38O, include a number of connections, a minimum connect time, flight restrictions, carrier restrictions, a weight, a volume, a product, an origin postal code, a destination postal code, a pickup time, a delivery time, a latest acceptance data/time, and a time of availability data/time, respectively. User interface 34 may include other search criteria inputs, such inputs to receive a number of pallets, a number of containers and the like, however, for ease of illustration, these are not shown in FIG. 3. Further, user interface 34 may include other regions and is not limited to one specification region 39, as further described below.

User 6 may activate or de-activate debug option 36 by selecting debug option 36 using any input mechanism, such as a mouse, keyboard, touch screen or other such input mechanism. In the illustrated embodiment, debug option 36 has been activated, as shown by the check mark. Debug option 36 may include any input control capable of indicating an active state and an inactive state. Example input controls include a check box, as shown in FIG. 3, a drop-down list, a graphical button and other such input controls.

Upon entering one or more search criteria into search criteria inputs 38 and activating or de-activating debug option 36, user 6 may select action input 40. In response, host computer system 22 processes the search criteria entered by user 6 via search criteria inputs 38, and queries flight management system 8 for flight data 18 that satisfies one or more of the entered search criteria. For example, host computer system 22 may query flight data 18 for only those flights that start at the "MSP" airport location and end at the "ORD" airport location. Additionally, host computer system 22 may further restrict the query by including other search criteria entered by user 6 such as one or more of those discussed above.

As described above, flight management system 8 and cargo management system 4 may apply configurable parameters 32B and 32A, respectively, to reduce the set of matching flights selected from flight data 18. If debug option 36 is in the inactive state, software modules 27 display only the reduced set of matching flights to user 6, i.e., the non-rejected portion of the matching flights. However, if debug option 36 is in the active state, user interface modules 27 also presents the flights that were rejected due to configurable parameters 32A or 32B, and presents respective indicators to user 6, as illustrated below. In some instances, the same flight may be rejected for numerous reasons. In this situation, host computer system 22 may provide multiple indicators.

FIG. 4 is an exemplary user interface 41 generated by user interface modules 27 (FIG. 2) when user 6 has selected action input 40 (FIG. 3) with debug option 36 in an active state. In the illustrated embodiment, user interface 41 includes item specification region 39 (see FIG. 3) and an item display region 42. As illustrated, user interface modules 27 may generate item specification region 39 in minimized form to "hide" debug option 36, search criteria 38, and action input 40, thereby allowing user 6 to more easily view item display region 42.

User interface modules 27 generate item display region 42 to display both the non-rejected portion 46 of the flights matching the user-supplied search criteria, as well as rejected flight 45 that would otherwise not be displayed but for the activation of debug option 36 (FIG. 3). In addition, user interface modules 27 generate item display region 42 to include indicator 44. In this example, indicator 44 comprises a text message to describe a reason for rejecting flight 45.

As shown in FIG. 4, both non-rejected flights 46 and rejected flights 45 comprise a variety of data that defines the flights. In this example, flights 45, 46 specify a flight number, a date, a segment, a pickup time, a latest acceptance time, a departure time, an arrival time, a number of stops, a weight and other flight related data for each individual flight.

Indicator 44 provides an indication of which configurable parameters 32A, 32B and search criteria 38 led to the elimination of rejected flights 45. In this example, indicator 44 indicates that rejected flights 45 is "Not Valid for Product," suggesting that rejected flight 45 was eliminated due to input entered into search criteria input 38I. User 6 may use this information to determine whether the proper product code was entered into search criteria input 38I and, whether one or more of configurable parameters 32A and 32B are properly configured to eliminate flights based on the product code. While only one flight is shown in FIG. 4 as rejected flights 45, item display region 42 may display numerous flights that have been rejected as well as one or more respective indicators as to why each flight was rejected. In this manner, the configuration of configurable parameters 32A and 32B may be verified.

Figure 5:
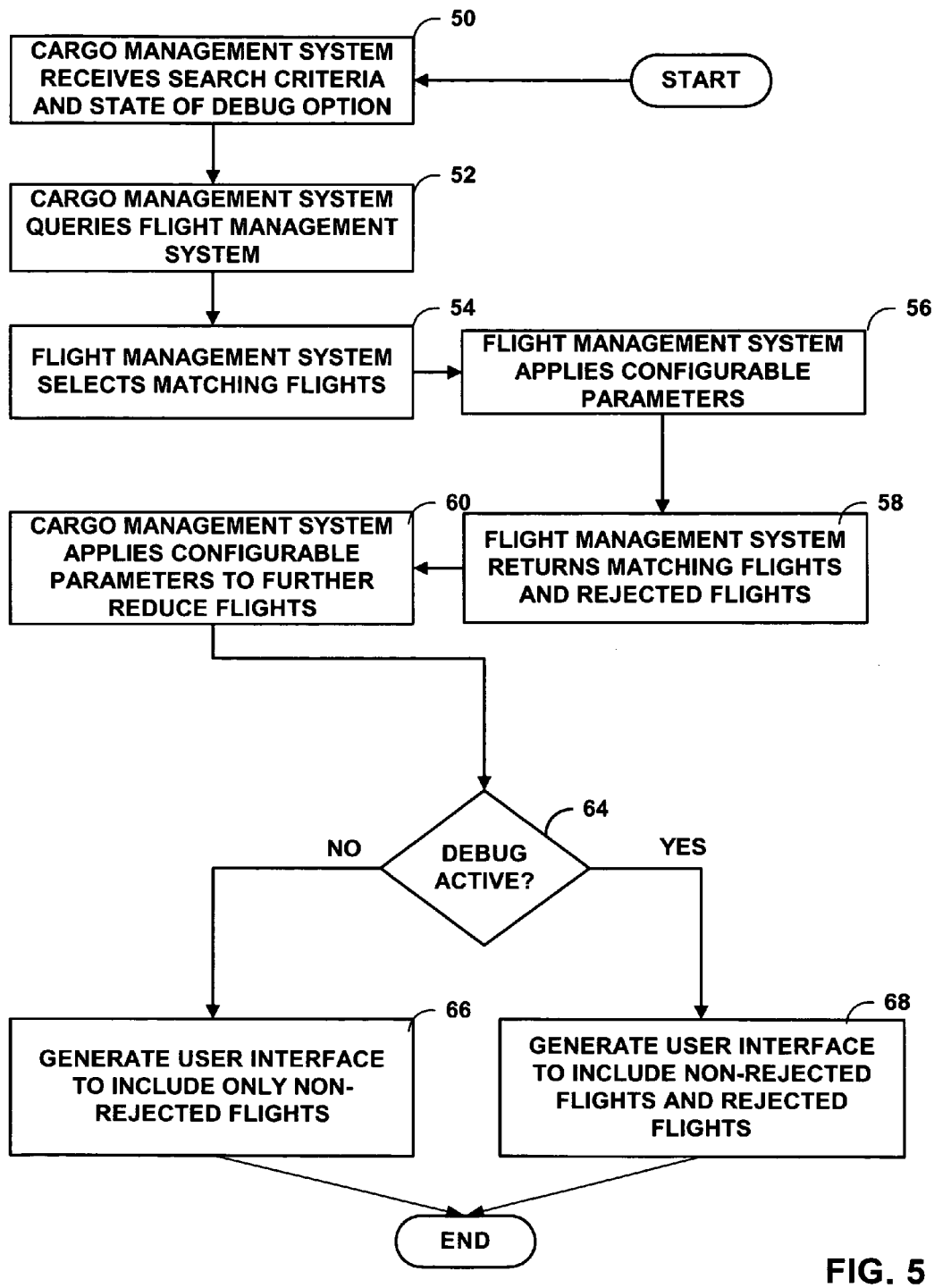
FIG. 5 is a flowchart illustrating example operation of debug option features of the user interface presented by a cargo management system.

FIG. 5 is a flowchart illustrating exemplary operation of cargo management system 4 and flight management system 8 (FIG. 1). More specifically, the flowchart illustrates operation of cargo management system 4 and flight management system 8 based on a state of user-selectable debug option 36 (FIG. 3).

Initially, cargo management system 4 receives search criteria from search criteria inputs 38 (FIG. 3) and the state of debug option 36 when user 6 selects action input 40 (50). In response, cargo management system 4 queries flight management system 8 based on one or more of the received search criteria (52). For example, host computer system 22 of cargo management system 4 may query flight management system 8 for only flights leaving from airport code "MSP" at 7:00 AM and arriving at airport code "ORD," wherein "MSP," 7:00 AM and "ORD" are search criteria entered by user 6.

Upon receiving a query from cargo management system 4, flight management system 8 selects flights based on the search criteria received from cargo management system 4 (54). Flight management system 8 then applies the configurable parameters 32B (FIG. 2) to identify a rejected portion and a non-rejected portion of the flights that match the search criteria (56). Flight management system 8 returns data describing the non-rejected flights, as well as data identifying any flights that were rejected due to the configurable parameters and indications of why the flights are rejected (58). In another embodiment, flight management system 6 only returns the rejected flights when the debug option 36 is active. Cargo management system 4, after receiving the non-rejected flights, further reduces the flights by automatically applying configurable parameters 32A (60).

If the state of debug option 36 was set to inactive (NO branch of 64), cargo management system 4 presents the user interface to user 6 to display only the non-rejected flights (66). If, however, the state of debug option 36 was set to active (YES branch of 64), cargo management system 4 presents the user interface to user 6 to display both the non-rejected flights and the flights that were rejected based on application of configurable parameters 32A, 32B, and respective indicators as to why each flight was rejected (68).

Various embodiments of the invention have been described. It is understood that these and other embodiments relating to other cargo carrier systems are within the scope of the following claims.

The invention claimed is:

1. A cargo management system comprising:
a network interface computer;
a user interface module executing on the network interface computer, wherein the user interface module presents a user interface to receive search criteria and a user-selectable debug option; and
a host computer that determines matching freight shipment items based on the search criteria, and applies a set of configurable parameters to the matching freight shipment items to identify a rejected portion and a non-rejected portion of the matching freight shipment items, and
wherein the user interface module displays the non-rejected portion and the rejected portion of the matching freight shipment items when the debug option is activated.

2. The system of claim 1, wherein the user interface module displays the non-rejected portion of the matching freight shipment items and excludes the rejected portion of the matching freight shipment items when the debug option is not activated.

3. The system of claim 1, wherein the user interface module generates the user interface to include respective indicators for the freight shipment items of the rejected portion, and wherein each indicator provides information describing a cause for the rejection of the respective freight shipment item.

4. The cargo management system of claim 3, wherein the host computer generates the indicators as text messages that present reasons for the rejections.

5. The cargo management system of claim 1, wherein the host computer further includes an interface to query an external flight management system to receive the matching freight shipment items.

6. The cargo management system of claim 1, wherein the search criteria, one or more criterion selected from the following class of criteria which indicate includes location, destination, date of delivery, date of shipment, number of connections flight restrictions, carrier restrictions, weight, volume, pickup time and delivery time.

7. The cargo management system of claim 1, wherein the freight shipment items describe flights.

8. The cargo management system of claim 1, wherein the freight shipment items comprise one or more of a container type, a special handling requirement, a time requirement, a weight requirement, a routing option, a carrier restriction, a delivery restriction, and a pickup restriction.

9. A processor-based method comprising:
presenting a user interface to receive search criteria and a user-selectable debug option;
determining matching freight shipment items based on the search criteria;
applying a set of configurable parameters to the matching freight shipment items to identify a rejected portion and a non-rejected portion of the matching freight shipment items, and
displaying the non-rejected portion and the rejected portion of the matching freight shipment items when the debug option is activated.

10. The processor-based method of claim 9, further comprising displaying the non-rejected portion of the matching freight shipment items and excluding the rejected portion of the matching freight shipment items when the debug option is not activated.

11. The processor-based method of claim 9, further comprising displaying respective indicators for the freight shipment items of the rejected portion, wherein each indicator provides information describing a cause for the rejection of the respective freight shipment item.

12. The processor-based method of claim 11, wherein displaying respective indicators comprises generating the indicators as text messages that present reasons for the rejections.

13. The processor-based method of claim 9, further comprising querying an external flight management system with the search criteria to receive the matching freight shipment items.

14. The processor-based method of claim 9, wherein the search criteria includes one or more criterion selected from the following class of criteria which indicate location, destination, date of delivery, date of shipment, number of connections flight restrictions, carrier restrictions, weight, volume, pickup time and delivery time.

15. The processor-based method of claim 9, wherein the freight shipment items describe flights.

16. The processor-based method of claim 9, wherein the freight shipment items comprise any one or more of a container type, a special handling requirement, a time requirement, a weight requirement, a routing option, a carrier restriction, a delivery restriction, or a pickup restriction.

17. A cargo management system comprising:
a first interfacing means for outputting a first user interface that includes a search input selection capability criteria and a debug control selection capability;
selecting means for selecting matching freight shipment items based on the selected search criteria; and
rejecting means for rejecting at least a portion of the matching freight shipment items; and
displaying means for displaying the rejected portion of the matching freight shipment items based on a state of the debug control selection.

18. The cargo management system of claim 17, further comprising indicator data generating means for generating indicator data for the freight shipment items of the rejected portion, wherein the indicator data provides information describing a cause for the rejection of each of the freight shipment items of the rejected portion.

19. The cargo management system of claim 18, wherein the indicator data generating means includes a text generating means for generating text messages that present reasons for each of the freight items of the rejected portion.

20. A system comprising:
a cargo management system that presents a user interface to receive search criteria and a debug option; and
a flight management system storing flight data and a first set of configurable parameters, wherein the flight management system identifies a set of matching flights from the flight data based on the search criteria, and further identifies a rejected portion and a non-rejected portion of the matching flights based on the first set of configurable parameters,
wherein the cargo management system receives the non-rejected portion and the rejected portion of the matching flights from the flight management system, and displays the non-rejected portion and the rejected portion of the matching flights when the debug option is active.

21. The system of claim 20, wherein the cargo management system stores a second set of configurable parameters, and applies the second set of configurable parameters to the non-rejected portion of the matching flights received from the flight management system to further reduce the non-rejected portion of the matching flights to a second rejected portion and a second non-rejected portion, and
wherein the cargo management system displays the second non-rejected portion, the first rejected portion and the second rejected portion of the matching flights when the debug option is activated.

* * * * *